Sept. 23, 1969  C. J. STALEGO ET AL  3,468,643
APPARATUS FOR FEEDING STREAMS OF HEAT SOFTENED MATERIAL
Filed April 20, 1966  3 Sheets-Sheet 1

CHARLES J. STALEGO & INVENTORS
EUGENE C. VARRASSO

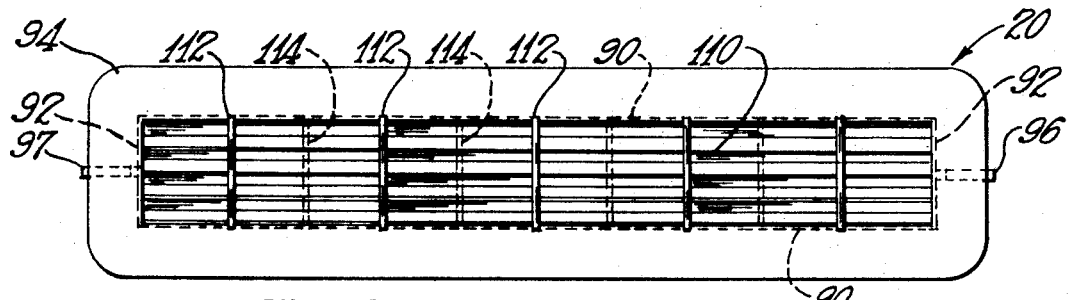
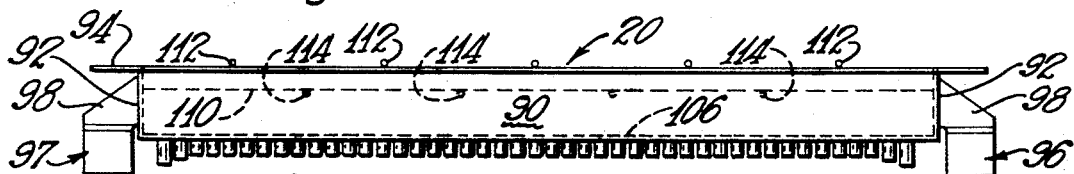
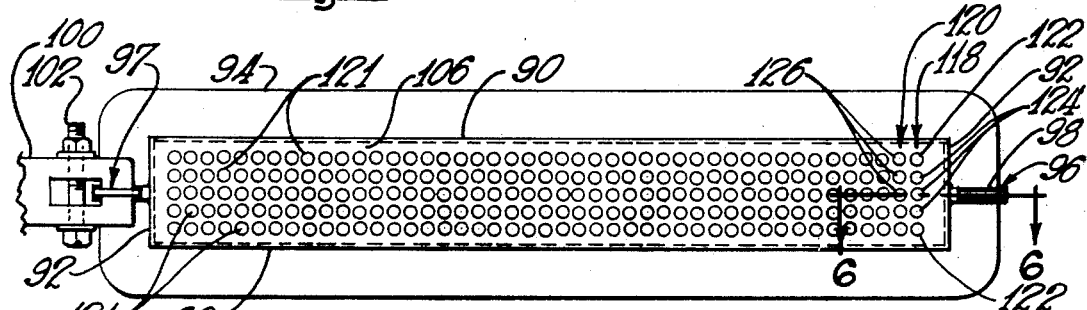
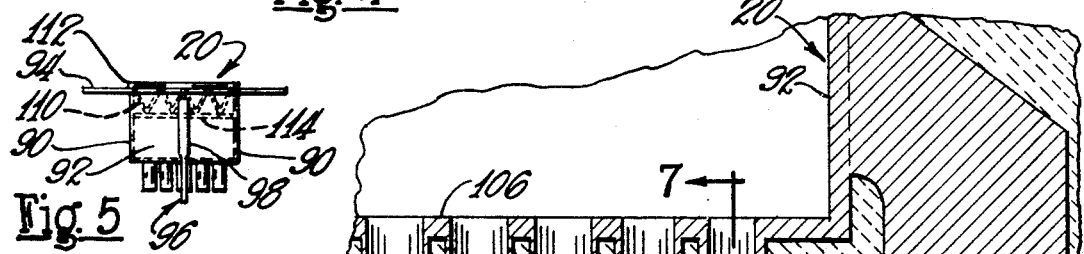
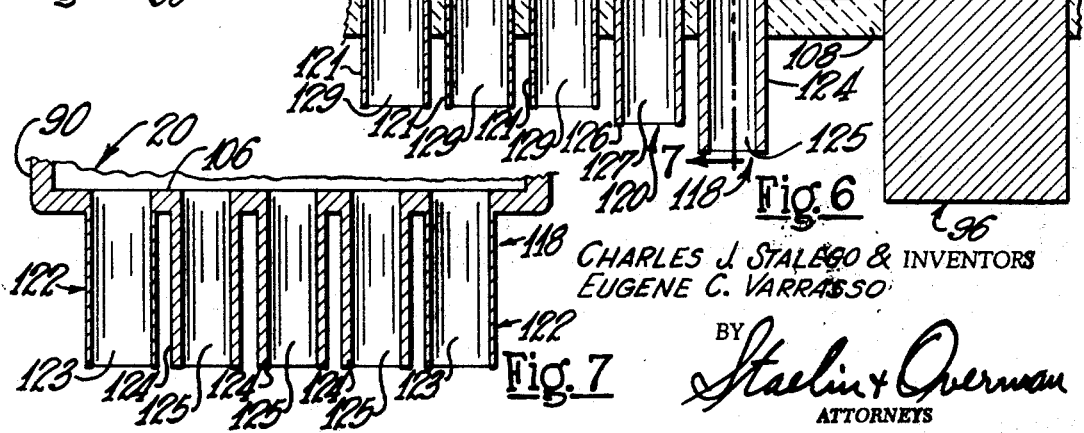

CHARLES J. STALEGO & INVENTORS
EUGENE C. VARRASSO

BY *Staelin & Overman*

ATTORNEYS

United States Patent Office 3,468,643
Patented Sept. 23, 1969

3,468,643
APPARATUS FOR FEEDING STREAMS OF HEAT-SOFTENED MATERIAL
Charles J. Stalego and Eugene C. Varrasso, Newark, Ohio, assignors to Owens-Corning Fiberglas Corporation, a corporation of Delaware
Filed Apr. 20, 1966, Ser. No. 543,968
Int. Cl. C03b 37/06
U.S. Cl. 65—1        7 Claims

ABSTRACT OF THE DISCLOSURE

The disclosure embraces a method of and feeder construction for flowing streams of glass through orificed projections depending from the feeder and correlating the characteristics of the orificed projections in zones of heat concentration and hence lower viscosity of the glass at such regions whereby to promote the delivery of streams of glass at substantially uniform flow rates through all of the orificed projections.

---

This invention relates to method and apparatus for flowing groups of streams of heat-softened material and more especially to a stream feeder and method for flowing streams of heat-softened glass from a supply, the streams being of a character adapted to be attenuated to primary filaments for further processing.

It has been a practice in forming fine blast-attenuated fibers of glass to flow a group of streams of glass from a stream feeder or bushing and the streams attenuated to primary filaments by pull rolls, and the primary filaments so formed continuously delivered into a high temperature gaseous blast, the heat of the gases of the blast softening the ends of the primary filaments and the velocity of the gases of the blast attenuating the softened material to fine fibers. An apparatus of this general character is illustrated in the patent to Stalego et al. 3,002,224.

In apparatus of this character, the streams of glass have heretofore been exuded through orifices or passages in tubular projections on the floor of the feeder or bushing wherein the orifices or passages have been of the same size. It has been found that the heat pattern or temperatures of the glass of the streams flowing from the orifices or passages are not uniform with consequent variations in viscosity of the glass streams, resulting in attenuated primary filaments of nonuniform diameters.

Stream feeders of this character are electrically heated by flowing electric energy lengthwise of the feeder, the current connections being made through terminal lugs at the respective ends of the feeder. It has been found that electric current flow lengthwise of the feeder establishes regions of concentration of heat at the end regions of the bushing or stream feeder adjacent the current supply terminals which increase in temperature renders the glass at such regions of lesser viscosity because of the nonuniform heat pattern adjacent the stream feeder section or floor of the feeder. The delivery of glass streams of nonuniform viscosities result in the formation of primary filaments of varying sizes. Such variations in filament diameters may be several thousandths of an inch. Where primary filaments of varying sizes are fed or delivered into an attenuating blast of a temperature to soften the glass of the filaments and attenuate the softened material to fine discrete fibers, the gaseous blast must be regulated so as to attenuate the coarsest of the primary filaments or a cold slug develops.

Thus the throughput of glass of lesser viscosity at the end zones of heat concentration is greater than the throughput at the other regions of the feeder and primary filaments of larger diameters are formed from the glass streams at the end regions because the pull rate or attenuating rate is the same for all of the filaments. By reason of this condition, the burner producing the gaseous blast must be adjusted or regulated to attenuate the coarsest primary filaments and, as the other primary filaments are of lesser size, the throughput of glass is substantially reduced with a consequent increase in the cost of producing blast-attenuated discrete fibers from primary filaments of widely varying sizes.

The present invention embraces a method of correlating the characteristics of the orifices or passages of a stream feeder to promote the delivery from the feeder of streams of heat-softened material, such as glass, of substantially uniform characteristics whereby primary filaments attenuated from the streams are of substantially uniform size.

Another object of the invention is the provision of a stream feeder or bushing wherein the characteristics of the tubular tips or orificed projections adjacent end regions of the stream feeder are modified from centrally disposed tubular projections whereby the streams of glass delivered from the end regions of the feeder provide substantially the same throughput as that of streams from other regions of the feeder.

Another object of the invention resides in the provision of a stream feeder or bushing wherein the orificed tips or tubular projections of one or more transverse rows adjacent the end regions of the stream feeder at the zones of heat concentration are of modified dimensions to compensate for the variations in viscosity of the molten glass adjacent the end rows of orificed tips whereby the glass flow or throughput of all of the streams from the feeder is substantially uniform to promote the formation of primary filaments of uniform diameter attenuated from the streams.

Another object of the invention resides in a method of correlating the characteristics of stream flow passages of a stream feeder to compensate for deviations in the heat pattern of the glass at the stream flow section of a feeder whereby streams of glass from the feeder may be attenuated into primary filaments of substantially uniform size and the primary filaments attenuated to fine discrete fibers by a high velocity blast whereby the total glass throughput of the feeder is increased with a consequent increase in the production of blast-attenuated fibers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 2 is a top plan view illustrating one form of stream feeder of the invention;

FIGURE 3 is a side elevational view of the stream feeder shown in FIGURE 2;

FIGURE 4 is a bottom plan view of the stream feeder shown in FIGURE 2;

FIGURE 5 is an end elevational view of the stream feeder shown in FIGURE 2;

FIGURE 6 is a greatly enlarged fragmentary sectional view taken substantially on the line 6—6 of FIGURE 4;

FIGURE 7 is a sectional view taken substantially on on the line 7—7 of FIGURE 6;

While the apparatus illustrated is particularly usable for flowing streams of glass for attenuation into primary filaments and the primary filaments fed into a gaseous blast for attenuation to fine discrete fibers, it is to be understood that the principles involved in the construction of the stream feeder and the method of operation may be advantageously utilized for flowing streams of heat-softened material for other purposes.

Figure 1:
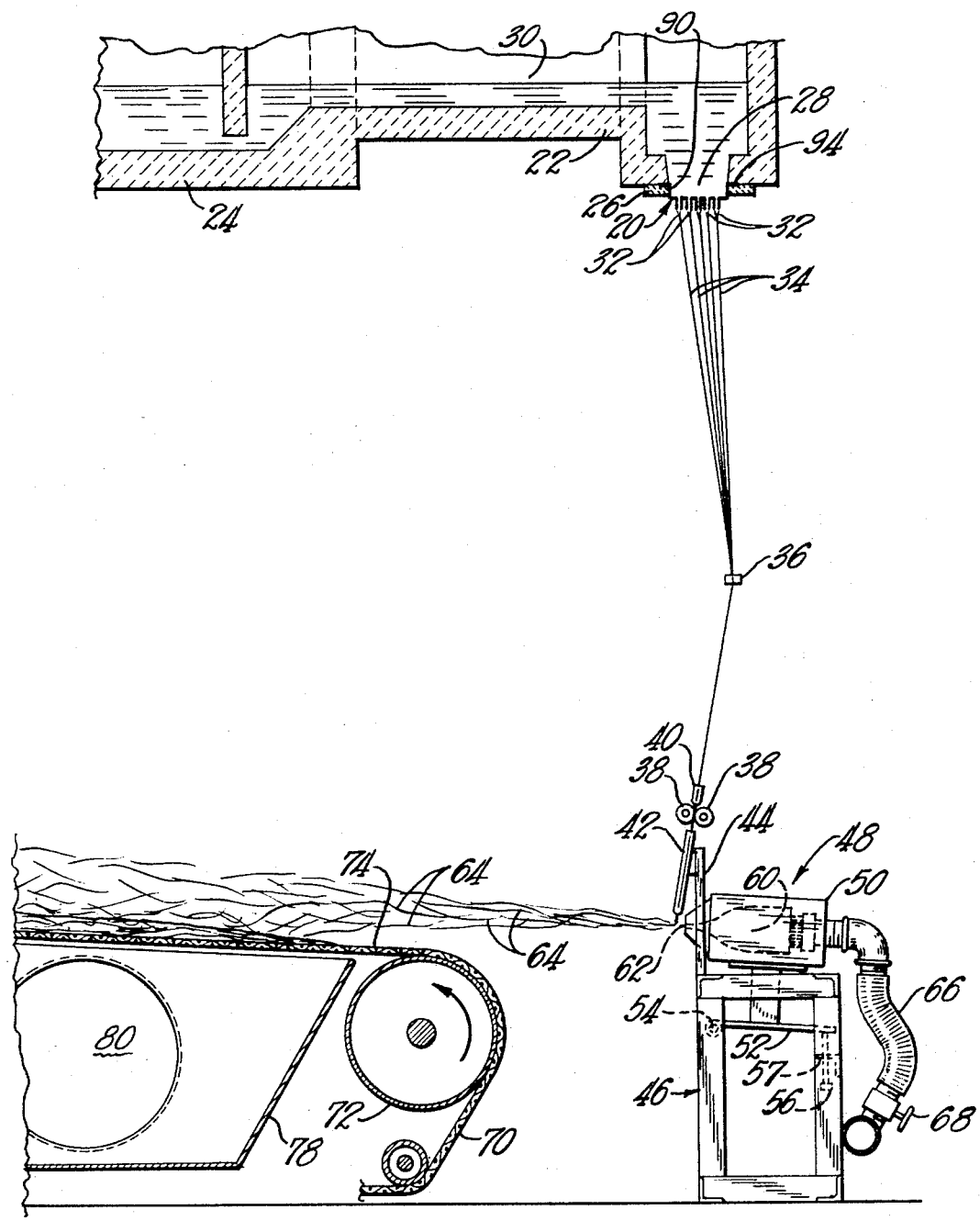
FIGURE 1 is a side elevational view of an apparatus for forming blast-attenuated fibers from primary filaments attenuated from streams of glass delivered from a stream feeder of the invention.

Referring to the drawings and initially to FIGURE 1 there is illustrated an apparatus or arrangement for flowing the streams of heat-softened glass or other heat-softened fiber-forming material from a stream feeder or bushing which are attenuated into primary filaments or primaries continuously delivered or fed into a high temperature gaseous blast for attenuation to discrete fibers. The stream feeder 20 of the invention is supported from a forehearth 22 and receives heat-softened glass from a melting and refining furnace or tank 24 of a character suitable for refining the glass or other heat-softened material suitable for attenuation to primary filaments.

The stream feeder 20 is secured to the forehearth 22 by a refractory member 26. The forehearth 22 is provided with a well 28 in registration with the stream feeder 20 for flowing glass into the stream feeder from the forehearth channel 30. One or more of the stream feeders 20 may be employed depending upon the number of blast attenuating units, there being a stream feeder provided for each blast attenuating unit. The feeder is formed of high temperature resistant metal or alloy.

Streams of glass 32 are delivered through orificed projections formed on the floor of the feeder 20 which are attenuated to primary filaments 34. The primary filaments or linear bodies 34 are oriented into a row with the filaments spaced laterally by a comb bar 36 of conventional construction. The streams 32 are attenuated into filaments 34 by engaging the filaments with feed rolls or pull rolls 38 driven at a substantially constant speed by a motor (not shown).

A guide means 40 is disposed to direct the spaced primary filaments 34 into proper engagement with the feed rolls 38, and a second guide means 42, disposed below the feed rolls 38, directs the primary filaments into a high temperature, high velocity gaseous attenuating blast. The guide means 42 is supported by a supplemental frame 44 mounted upon a main frame 46. A blast attenuating unit 48 is provided for each group of primary filaments 34, each blast attenuating unit including a burner 50 preferably adjustably supported by the main frame 46.

The blast-producing internal combustion burner 50 is supported upon a platform 52 mounted for pivotal movement about a pivot pin 54, the angularity of the burner unit 50 being adjustable by means of a threaded member 56 or other means carried by a bracket 57 and engageable with the relatively movable platform 52. The internal combustion burner construction 50 may be of the character shown in Patent 3,002,224 wherein a combustible mixture of fuel gas and air is introduced into a confined combustion chamber or zone 60, the mixture substantially completely burned within the combustion chamber.

The intensely hot gases of combustion are delivered at high velocities through a restricted orifice 62 of the burner providing a high temperature, high velocity gaseous blast engaging and softening the advancing filaments 34 and attenuating the softened glass of the filaments to fine discrete fibers 64. The combustible mixture is delivered into the rear of the burner 50 from a supply through a manifold 66, the mixture delivered to the burner being regulated or controlled by a valve 68. Disposed forwardly of the blast attenuating unit or units 48 is an endless belt conveyor 70 supported upon rolls 72, one of which is shown in FIGURE 1.

One of the rolls 72 is driven in a direction whereby the upper flight 74 of the belt is advanced away from the burner units and the discrete fibers 64 collected upon the upper flight 74.

Disposed beneath the upper flight 74 of the conveyor is a walled chamber or receptacle 78 connected by a pipe or tube 80 with a section blower (not shown) or source of reduced pressure whereby reduced pressure is established within the chamber 78 to assist in collecting and retaining the discrete fibers 64 on the conveyor flight 74.

One form of the bushing or stream feeder 20 of the invention is illustrated in FIGURES 2 through 7 and is of elongated rectangular shape having side walls 90 and end walls 92. The stream feeder or bushing 20 is fashioned with a horizontal flange 94 surrounding and secured to the upper regions of the ends and side walls of the feeder. As shown in FIGURE 1, the flange 94 is engaged by the refractory member 26 to secure the feeder or bushing to the forehearth or other means containing a supply of heat-softened glass.

Welded or otherwise secured to the central regions of the end walls 92 are terminals or lugs 96 and 97, the lugs having thickened portions 98 at the juncture of the terminals with the end walls 92. Terminal clamps or connectors 100, one of which is shown in FIGURE 4, are connected to the terminal lugs 96 and 97 and are adjustably secured to the lugs and held in adjusted position by bolts 102. The terminal clamps or connectors 100 are connected with an electric current supply whereby current flow is established through the stream feeder or bushing 20 to maintain the heat-softened glass in the feeder in flowable condition.

The bushing is fashioned with a floor or tip section 106 provided with lengthwise and transversewise rows of tubular projections providing passages or orifices through which flow streams 32 of glass from the supply in the feeder. The arrangement and characteristics of the tubular projections will be hereinafter described in detail. The floor or tip section 106 may be provided exteriorly with a layer 108 of high temperature resistant insulation to reduce heat losses.

Disposed in the upper region of the feeder or bushing 20 is a perforated metal screen or filter 110 preferably fashioned as a connected series of V-shaped configurations to prevent entrance of stones or other unfused material into the feeder. The screen or filter 110 is supported by an upper row of transversely disposed members 112 which engage and are welded to the flange 94 and to the screen, and a lower row of members 114 which are welded to the side walls 90 of the feeder.

The stream feeder or bushing including the terminal lugs 96 are fashioned of high temperature resistant metallic material such as an alloy of platinum or rhodium or other suitable material which will withstand the temperature of the molten glass. The flow of electric current through the lugs 96 into the ends of the stream feeder or bushing 20 establishes a concentration of heat and increased temperature at the end regions of the stream feeder and in the glass in the end regions so that the glass at said regions is of a lesser viscosity than the glass in the mid or central region of the stream feeder.

Heretofore the tubular projections on a tip section of a feeder have been fashioned with passages or orifices of the same size for flowing streams of glass from the feeder. It has been found that the molten glass in the end regions, being at higher temperatures and hence of lesser viscosity, flows through the tubular projections adjacent the end regions at a higher rate than the flow rate of the other tubular projections of the same size. In attenuating the glass streams to primary filaments, all of the primary filaments are attenuated at the same linear speed but, as a greater amount of glass flows through the passages at the end regions of the feeder, the primary filaments from such glass streams are of increased diameters.

This condition reduces the total throughput of the stream feeder and reduces efficiency of fiber production because the burner producing the attenuating blast must be adjusted to attenuate the coarsest of the primary filaments to discrete fibers. It has been found that by modifying the characteristics of the tubular projections adjacent the ends of the stream feeder, a more uniform throughput of glass through all of the projections is attained with a consequent substantially uniformity in the size of the filaments attenuated from all of the streams.

An end region of the floor or tip section is illustrated in FIGURE 6 showing one form of construction for accomplishing the objectives of the invention.

As both end regions are modified in the same manner, only one end region has been illustrated in FIGURE 6. The transverse row of projections at the end of the feeder is indicated at 118 and the next adjacent row indicated at 120. The tubular projections 121 on the stream feeder between the rows 120 have the same size characteristics.

The projections of the end row 118 are fashioned with passageways of a character to control the amount of glass flowing through the projections so that the throughput from each projection is substantially the same. The two projections 122 at each corner of the stream feeder have passages or orifices 123 of greater diameter than the diameter of passages 125 in the three intermediate projections 124, the corner projections 122 being subjected to an increased cooling effect of the atmosphere.

By providing the corner projections 122 with passages of a diameter greater than the passages 125 in the intermediate projections 124, the throughput of glass through projections 122 is substantially the same as the throughput through the passages of the projections 124. Where a comparatively low temperature glass is employed, the passages in the projections are made proportionally larger than in installations where a higher temperature glass is employed.

Thus with a higher temperature glass and a decreased viscosity, the passages in the tubular projections are made proportionately smaller to obtain a desired throughput per unit of time.

The passages 127 in the tubular projections 126 of the second transverse row 120 may be of substantially the same internal diameter but are slightly larger in diameter than the passages 125 of the projections 124 in the end row.

The passages 129 in the remaining tubular projections 121 on the tip section 106 are preferably of the same diameter or size as the heat pattern or temperature of the glass adjacent the projections 121 and is substantially stabilized but at a lesser temperature than the end regions where the heat is concentrated. The passages in the projections 121 are preferably of slightly larger diameter than the size or diameter of passages 127 in the projections 126 of the row 120.

As an example the following is indicative of the approximate range of differentials in passage diameters or sizes. The diameters of the passages 127 in projections 126 of row 120 are between .005 and .010 thousandths of an inch less than the diameters of passages 129 in the projections 121. The passages 125 in the intermediate projections 124 of the end row 118 may be .005 to .010 thousandths of an inch less than the diameters of the passages 125 in projections 124.

The passages in the corner projections 122 may be between .005 and .010 thousandths of an inch greater than the passages 127 in projections 126 of the second row 120.

For a comparatively low temperature fusing glass, the diameters of the passages 129 in projections 121 may be between .195 and .235 thousandths of an inch in diameter. If a glass of higher fusing temperature is utilized, the diameters of the passages 129 in projections 121 may be reduced in size and the projections in the rows 118 and 120 proportionately changed in size.

Another characteristic affecting the throughput of glass of a tubular projection is the length of the projection on the floor or tip section of the feeder. By increasing the length of a projection, proportionately more heat is dissipated through the wall thereof by reason of the increased metallic surface area in contact with the glass in the passage. Thus a further factor that may be utilized in the regulation or control of the throughput of glass at the zones of heat concentration at the end regions of the feeder is the length of the orificed projections.

As shown in FIGURES 6 and 7 the projections 122 and 124 are of slightly greater length than the projections 126 in the adjacent transverse row 120, and the projections 126 are of slightly greater length than the length of the projections 121. Thus, in the form shown in FIGURES 6 and 7, wherein the projections in the rows 118 and 120 are of different lengths, the differentials in the sizes of the passageways in the projections may be supplemented by modification of the lengths of the projections in controlling the throughput of glass in the zones of heat concentration at the ends of the feeder.

From the foregoing it will be seen that where the temperature is stabilized at the central regions of the feeder adjacent the projections 121 the passages in the projections are preferably of the same diameters. At the regions of high heat concentration adjacent the ends of the feeder the passages in the second row 120 from the end are of reduced diameter while the passages in the intermediate projections 124 of the end row 118 are further reduced in diameter, the passages in the corner projections 122 made proportionately larger. Through such arrangement, the glass throughput of the passages in the projections throughout the entire tip section may be maintained substantially uniform.

In stream feeders or bushings embodying an increased number of projections in transverse rows, the differentials of the passage sizes in the end row 118 may be varied in the same manner as described and the passages in the projections 126 of an adjacent row 120 may likewise be varied, but the differentials in passage sizes in the zone of heat concentration should be maintained to secure a substantial uniform throughput of glass through all of the orificed projections on the tip section.

FIGURES 8 through 11 illustrate an orientation or pattern arrangement of sizes for flow passages wherein all of the projections on the feeder are of substantially the same length.

Figure 8:
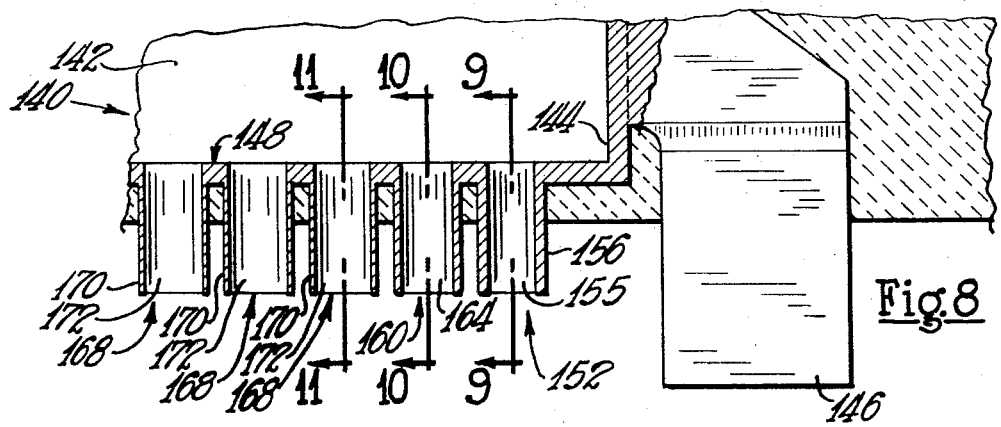
FIGURE 8 is a view similar to FIGURE 6 illustrating a modification of characteristics of passages of tubular projections of widthwise rows adjacent an end of a feeder bushing.

The feeder 140 is of substantially the same shape as the feeder 20 shown in FIGURES 2 through 5, the feeder having side walls 142 and end walls 144, one of each being shown in FIGURE 8. A terminal lug 146 is welded or otherwise integrated with each end wall 144 for connection with a supply of electric current.

The feeder 140 shown in FIGURE 8 has a floor or tip section 148, the floor being fashioned with a plurality of lengthwise rows and transverse rows of tubular projections or tips oriented in substantially the same pattern as in the form shown in FIGURE 4. Several projections of one lengthwise row of the projections are illustrated in FIGURE 8, and the first three transverse rows of projections adjacent an end region of the feeder are illustrated respectively in FIGURES 9, 10 and 11, the views being taken on the section lines on FIGURE 8.

Figure 9:
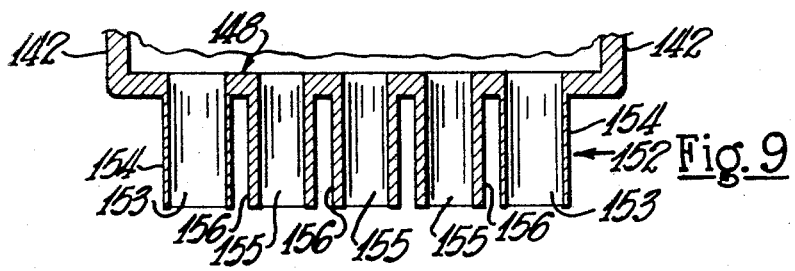
FIGURE 9 is a sectional view through an end widthwise row of orificed projections, the section being taken substantially on the line 9—9 of FIGURE 8.

The end row of projections is indicated at 152 in FIGURES 8 and 9. With particular reference to FIGURE 9, the passages 153 in the projections 154 at the corners of the floor or tip section 148 are of a diameter greater than the passages 155 in the three intermediate tips 156 in the end row 152 so that the glass flow or throughput through the passages 153 at the corners of the tip section is substantially the same as the glass flow or throughput of the passages 155 of the projections 156 which are at the zone of greatest heat concentration in the end region of the stream feeder or bushing 140.

Figure 10:
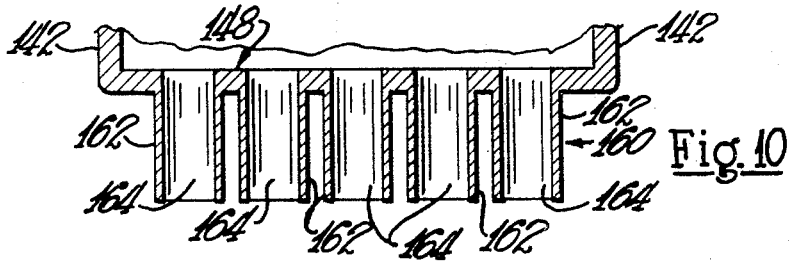
FIGURE 10 is a transverse sectional view taken on the line 10—10 of FIGURE 8 through the widthwise row of projections adjacent the end row.

FIGURE 10 illustrates the second row 160 of projections 162 adjacent the first row 152. The passages 164 in each of the projections 162 are of substantially the same diameter. The passages 164 are of greater diameters than the diameters of passages 155 in the intermediate projections 156 of the end row 152.

It has been found that while the differences in diameters may be proportionate to the mean temperature and hence viscosity of the glass in the stream feeder, the diameter of each of the passages 164 is preferably within a range of .005 to .010 of an inch greater than the diameter of the passages 155 in the projections 156, shown in FIGURE 9, because the projections 160 are farther removed from the zone of highest concentration of heat at the end row 152.

Figure 11:
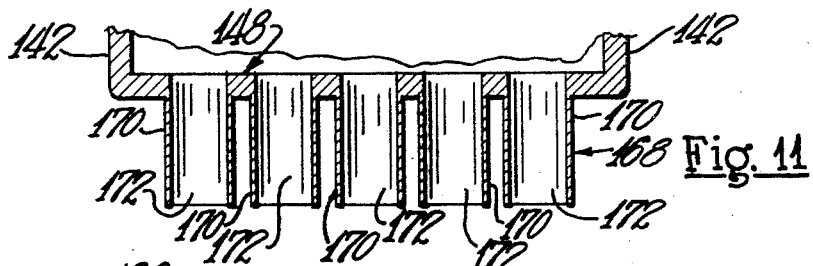
FIGURE 11 is a transverse sectional view through a widthwise row, the section being taken on the line 11—11 of FIGURE 8.

FIGURE 11 illustrates one row of the projections 170 of the remaining transverse rows 168 of projections throughout the area of tip section 148 between the rows 160 of projections adjacent the end regions of the stream feeder. The passages 172 in the projections 170 are preferably of the same diameter but of a diameter greater than the diameter of passages 164 in the row 160 of projections. As an example indicative of passage sizes, the diameter of each of the passages 172 is preferably in a range of from .005 to .010 thousandths of an inch greater than the diameter of the passages 164 in row 160. The corner projections 154, shown in FIGURE 9, may be of a diameter substantially the same as the diameters of the passages 172.

It is to be understood that the sizes of various stream flow passages at the zones of heat concentration at the ends of the stream feeder may be modified dependent upon the type and composition of glass employed and individual operating conditions to attain substantially uniform glass flow or throughput from all of the projections. The principles of the invention provide effective compensation for differences in glass viscosity and involve the orientation or pattern of size characteristics of the tubular projections on the tip section of a stream feeder whereby the stream flow or throughput of a glass of lesser viscosity at the zones of heat concentration is maintained substantially the same as the stream flow or throughput of other stream flow passages so that streams of glass of uniform flow or throughput may be attenuated to primary filaments of substantially uniform size.

Figure 12:
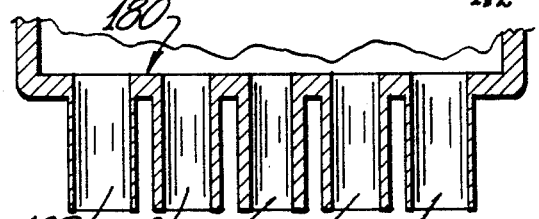
FIGURE 12 is a sectional view similar to FIGURE 9 illustrating a further modification of characteristics of stream flow passages.

It is found that in the use of some stream feeders very high heat concentration occurs in the glass adjacent the central tubular projection of each end row which is nearest to the juncture of the terminal lug 97 to an end wall 92 of the stream feeder. FIGURE 12 illustrates an example of comparative orifice sizes of the end transverse row of projections wherein the glass of highest temperature is adjacent the central projection.

The floor or tip section 180 has an end row of projections in which the corner projections are indicated at 182, the central projection indicated at 184 and projections 186 intermediate the central end corner projections. The passage of the projection 184 is of the smallest diameter, the passages in the corner projections are of the largest diameter and comparable to the diameter of the large number of central projections on the tip section. The passages in the intermediate projections 186 are of intermediate size.

As an example, the size range of the passages in the projections 186 is between .005 and .010 of an inch larger in diameter than the diameter of the passage in the central projection 184. The passages in the corner projections 182 are preferably in a range of .009 to .018 of an inch larger in diameter than the diameter of the passages in the projections 186. It is to be understood that the foregoing examples are indicative of the range of differences in sizes of the passages, and the passage sizes may vary with particular installations and the temperature of the glass employed to attain a substantially uniform flow or throughput of glass through the tubular projections adjacent the ends of the bushing and through the other tubular projections disposed between the rows of projections adjacent the end regions of the bushing.

It is apparent that, within the scope of the invention, modifications and different arrangements may be made other than as herein disclosed, and the present disclosure is illustrative merely, the invention comprehending all variations thereof.

We claim:

1. Apparatus for delivering streams of heat-softened glass comprising a relatively stationary elongated stream feeder having a floor section provided with lengthwise-spaced transversely-disposed rows of depending tubular projections, terminals at the ends of the stream feeder for connection with electric current supply for heating the glass in the feeder, the tubular projections providing passages through which the glass flows in a plurality of streams, the passages in the transverse row of projections at each end region of the feeder floor section intermediate the end projections of the said rows being of lesser diameter than the passages in the projections of the remaining rows to provide increased resistance to glass flow through the passages of lesser diameter.

2. The combination according to claim 1 wherein the passages provided by the tubular projections at the ends of the transverse row of projections adjacent each end of the feeder are of a diameter greater than the diameter of the passages in the projections intermediate the end projections of the said end rows.

3. Apparatus for delivering streams of heat-softened glass comprising a relatively stationary elongated stream feeder having a floor section provided with lengthwise-spaced transversely-disposed rows of depending tubular projections, terminals at the ends of the stream feeder for connection with electric current supply for heating the glass in the feeder, the tubular projections providing passages through which the glass flows in a plurality of streams, the passages in the central projections of the transverse row at each end region of the feeder floor section being of lesser diameter than the passages in the projections of the transverse row adjacent each end row.

4. The combination according to claim 3 wherein the passages in the third transverse row of projections from each end of the floor section are of greater diameter than the diameter of the passages in the projections in the second transverse row from each end.

5. Apparatus for delivering streams of heat-softened glass comprising a relatively stationary elongated stream feeder having a floor section provided with lengthwise-spaced transversely-disposed rows of depending tubular projections, terminals at the ends of the stream feeder for connection with electric current supply for heating the glass in the feeder, the tubular projections providing passages through which the glass flows in a plurality of streams, the tubular projections of the transverse row at each end region of the feeder floor section being of greater length than the tubular projections of the adjacent row.

6. Apparatus for delivering streams of heat-softened glass comprising a relatively stationary elongated stream feeder having a floor section provided with lengthwise-spaced transversely-disposed rows of depending tubular projections, terminals at the ends of the stream feeder for connection with electric current supply for heating the glass in the feeder, the tubular projections providing passages through which the glass flows in a plurality of streams, the tubular projections of the third transverse row of projections from each end of the feeder floor section being of lesser length than the length of the projections in the second transverse row from each end of the feeder floor section.

7. Apparatus for delivering streams of heat-softened glass comprising a relatively stationary stream feeder of elongated configuration having a floor section provided with a plurality of tubular depending projections, said projections being arranged in lengthwise spaced transverse rows, terminals at the ends of the stream feeder for connection with electric current supply, the tubular projections providing passages through which the glass flows in a plurality of streams, the passages in the rows of projections adjacent the end regions of the feeder in the zones of concentration of heat established by current flow being of reduced diameter to provide increased resistance to glass flow through the passages at said regions to promote more uniform throughput of glass through all of the tubular projections.

References Cited

UNITED STATES PATENTS

| | | | |
|---|---|---|---|
| 2,489,243 | 11/1949 | Stalego | 65—7 |
| 2,706,365 | 4/1955 | Stalego | 65—12 |
| 3,304,164 | 2/1967 | Charpentier et al. | 65—1X |

FOREIGN PATENTS 641,809    5/1962    Canada.

S. LEON BASHORE, Primary Examiner

R. L. LINDSAY, Jr., Assistant Examiner

U.S. Cl. X.R.

65—16, 12, 7